Figure 1:
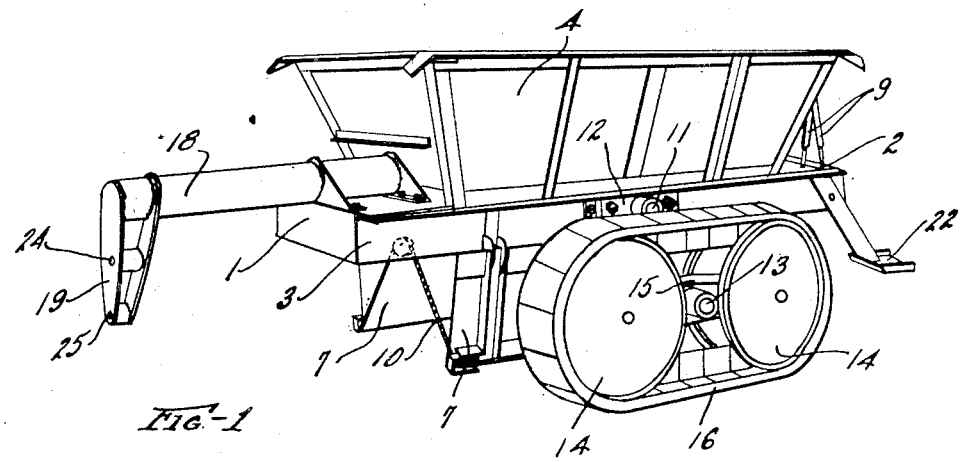

March 25, 1930.  A. P. ARMINGTON ET AL  1,752,056

DUMP TRAILER

Original Filed Sept. 7, 1928

INVENTOR
ARTHUR P. ARMINGTON
AND
STEWART F. ARMINGTON.

BY
Brockett, Hyde, Rigley & Meyer
ATTORNEYS

Patented Mar. 25, 1930

1,752,056

UNITED STATES PATENT OFFICE

ARTHUR P. ARMINGTON AND STEWART F. ARMINGTON, OF WILLOUGHBY, OHIO, ASSIGNORS TO THE EUCLID CRANE & HOIST COMPANY, OF EUCLID, OHIO, A CORPORATION OF OHIO

DUMP TRAILER

Continuation of application Serial No. 304,462, filed September 7, 1928. This application filed May 1, 1929. Serial No. 359,600.

This invention relates to earth moving apparatus of the dump trailer type and adapted for use in a train with other similar trailers, as drawn by a heavy-duty tractor between loading and dumping positions; and the invention particularly relates to trailers of the so-called cart type, that is, equipped with running gear such as a single pair of wheels or wheel substitutes by which substantially all of the load is carried, in substantially balanced relation thereon.

A typical dump trailer of the class to which reference is had, comprises as its principal parts a load container-body, mobile supporting means therefor, and draft hitch means secured with the body.

The body may comprise an open-bottom hopper with a frame at its base and dumping doors associated with the frame to control dumping of the load from the hopper.

As to the mobile supporting means for the container-body, this invention particularly contemplates a location thereof substantially medial or midway of the ends of the vehicle, and a relationship between the supporting means and the described body such that the body may tilt as a unit upon the supporting means in a longitudinal plane, whereby the distribution of load, both live and dead, will be substantially equal and uniform fore-and-aft of the axis of tilt.

Such supporting means comprise generally, therefore, medially located axle means secured with the body, and running gear associated with the axle means.

Where the dump trailer is of large capacity such as is contemplated in this invention it becomes necessary to employ running gear of endless tread type, that sufficient bearing upon the ground be obtained to support the enormous weight of the loaded container. A unit of such endless tread includes at least a pair of spaced wheels about which is arranged an endless tread linkage. Thus the wheels may be and usually are of relatively small diameter yet large bearing is provided by the lower stretch of tread linkage.

The axle means, by which term is included an axle or something which takes the place thereof, serves to support the body upon the running gear, with the body in elevated position thereabove and freely tiltable fore-and-aft thereon.

The mobile supporting means are centrally located relative to the ends of the body so that the body is substantially balanced upon the running gear when in horizontal or operative load-carrying position, but in unstable equilibrium.

The draft hitch means are secured with the body as at either end thereof, whereby if the hitch means at either end of the body is secured with drift means of a leading or following vehicle, the body is maintained thereby against fore-and-aft tilting and in substantially balanced position.

The subject matter of the present case pertains to means for maintaining stability of the parts, and this case is a continuation of our copending application, Serial No. 304,462, filed September 7, 1928.

Another object of the present invention is to provide a dump door arrangement for the body which shall insure uniform dumping of the load fore-and-aft of the axis of tilt of the body whereby the center of gravity of the body, whether loaded or unloaded, is not moved relative to the axis of tilt, so that the balance of the body on this axis will be maintained independent of whether the load is carried or dumped. To this end we provide dumping doors each extending the full length of the container opening, through the zone of the axis of tilt and equally therebeyond, and arranged to swing about a longitudinal axis downwardly and laterally to depending dumping position.

That the body may be maintained in elevated position to clear the dumped load and particularly where the running gear is of endless tread type and thus relatively slight vertical dimension, it becomes necessary that the center of gravity of the body be well above the axis of tilt, the elevation of which is defined by the running gear. Obviously the higher the center of gravity of the body above the axis of tilt, the more unstable is the equilibrium of the body.

A further object of our invention is to so elevate the body and to provide the body with a single pair of dumping doors each extending the full length of the container opening and arranged to swing about a side edge thereof downwardly and outwardly to depending dumping position.

It is generally desirable that the axle means include a member extending across the body, and a further object of our invention is to arrange this transverse member above the doors that the latter may extend through the zone of the transverse member as described.

Figure 2:
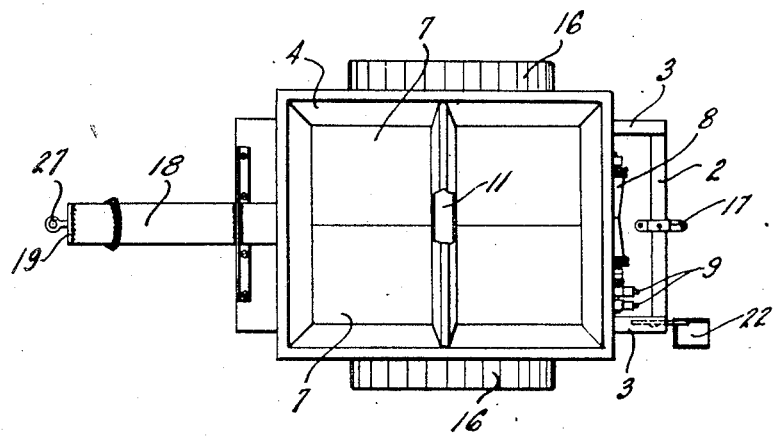
Figure 3:
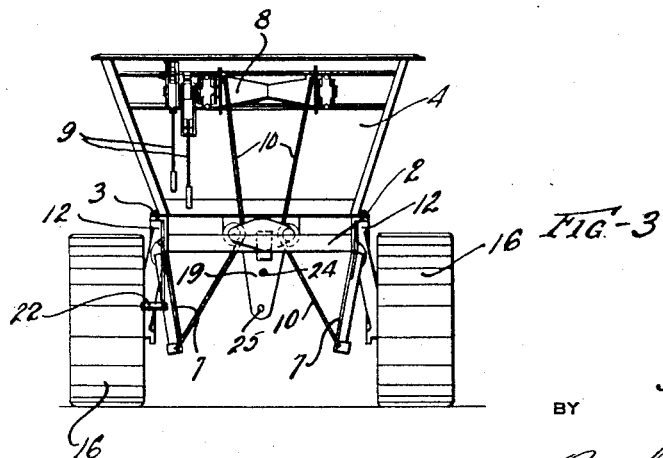

The exact nature of our invention together with further objects and advantages thereof will be apparent from the following description taken in connection with the accompanying drawings in which Fig. 1 is a perspective view of an embodiment of our invention taken from the forward left quarter and showing the vehicle body in normal horizontal or running position, and the dumping doors thereof open; Fig. 2 is a plan view of the same showing the doors in closed or load-carrying position; and Fig. 3 is a rear end elevation of the parts as they appear in Fig. 1.

With reference now to the drawings, the vehicle has a frame of generally rectangular form, built of structural steel sections with front and rear end members 1, 2 and side members 3. A hopper 4 is mounted on the frame, the base of the hopper being shorter than the frame, which latter, therefore, extends longitudinally therebeyond. Preferably the frame includes transverse members located between the frame side members 3 and along the hopper end walls at their bases.

Hinged to the side members of the frame for swinging movement between horizontal closed position as indicated in Fig. 2, and downwardly and outwardly therefrom to depending open or dumping position as indicated Fig. 1, are a pair of doors 7. A drum 8 controlled by levers 9 is arranged as on the rear wall of the hopper 4, and a line 10 leading therefrom over suitable sheaves on doors and frame for the purpose of controlling the doors. A step platform 22 is provided to support an operator in position to manipulate the levers 9.

Thus, the parts described constitute generally a load-containing body having a dumping bottom. Mobile supporting means for this body are provided and in the embodiment shown comprise axle means of generally inverted-U form having a transverse member 11 arranged midway between the hopper ends, above the doors, and passing through the side frame members, with its projecting ends fixed in brackets 12. The brackets in turn are secured with the side frame members and extend downwardly therefrom and carry at their ends outwardly turned stub axles 13. Running gear located on either side of the frame is associated with the stub axles, and as illustrated, the running gear is of the well-known creeper type comprising paired wheels 14 mounted on rocker beam 15 and having trained thereabout an endless tread linkage 16. Thus the axle means by its arched form has an immediate connection with the frame supporting the same and therefore the body as a unit, well above the ground that the doors may clear the ground in open position, and whereby both axle means and frame will clear the dumped load.

It will be noted that the body is free to tilt fore-and-aft about the running gear and in the embodiment shown, upon an axis common with the stub shafts 13. The axle means is substantially medial of the body so that the body is substantially balanced upon the running gear whether or not a load is being carried. Thus the trailer is generally of cart or two-wheeled type as distinguished from wagon or four-wheeled type.

At the rear of the frame and centrally thereof as secured with the rear member 2 is a hitch means 17 of any suitable form.

At the front of the trailer we provide draft hitch means of arched form and having as its principal members a forwardly extending tongue member 18 and a hitch member 19 secured at the forward end thereof and downwardly extending therefrom, the tongue member having openings 24, 25 adapted to optionally receive a draft bolt 27, shown in Fig. 2, for hitch connection with draft means such as a tractor or preceding similar dump trailer. The drawbar parts are so proportioned and arranged that when the proper hitch is made the container-body of the trailer will be in horizontal position as in Fig. 1.

As already described, in this position the container-body, whether loaded or empty, is substantially balanced upon the running gear, but because of the pivotal connection on the axis of the stub shafts 13, the body is in unstable equilibrium and free to tilt fore-and-aft but for its connection by its hitch means.

It will be noted that each door 7 extends the full length of the container opening, uninterrupted through the central transverse vertical plane of zone of the body in which zone lies the transverse axle member 11, the stub shafts 13 and the center of gravity of the body. The result is that since the doors move on longitudinal axes and extend equally fore-and-aft of this zone, equal and uniform dumping of the load fore-and-aft of the zone is insured, so that the balance or equilibrium of the body on the running gear is maintained independent of whether the load is carried or completely dumped or partially dumped.

Were separate doors, as heretofore employed in the art, arranged fore-and-aft respectively of the axle means 11, much more complicated door-actuating mechanism would be necessary and it would be possible that the doors on one end of the vehicle might stick and remain closed or open later than those on the other end of the vehicle. Such malfunction, which has actually occurred in the prior art, obviously results in the worst possible condition of unbalance of the body and great danger to the operator who would be mounted on the vehicle at the time for the purpose of tripping and reclosing the dump doors.

And where a single pair of doors are employed as shown, equal dumping of the load is more positively insured, since when the doors are dropped to dumping position the hopper bottom is entirely open and clear for the load except for the centrally located axle member 11.

Further resulting advantages of the employment of the single pair of doors are that the lower exposed stretches of the running gear are protected by the doors in a measure impossible were separate doors, arranged fore-and-aft of the axle means, employed.

Likewise, when the load is dumped and the vehicle moved off the dumped load the single pair of doors with their uninterrupted surfaces bearing upon the load slide easily therefrom.

It will be noted that in the trailer shown the center of gravity of the load is well above the axis of tilt. Here it becomes particularly important that the balance of the load on this axis be maintained since angular displacement of the body on the running gear produces an exaggerated linear displacement of the load from its balancing position.

What we claim is:

1. A heavy-duty dump trailer of cart class, comprising an open-bottom container-body, mobile supporting means for said body, including running gear characterized by rolling elements of diameter less than the width of the body opening and medially located axle means associating the body with the running gear, said axle means being arched over the bottom opening and including arms depending from the body and having at their lower ends tilting bearing connection with said gear, whereby the body is supported in elevated position to tilt fore-and-aft about the bearing axis and is substantially balanced but in unstable equilibrium over said axis, and a single pair of dumping doors for said opening each extending the full length thereof and mounted to swing downwardly and laterally to dumping position, whereby dumping of the load will be uniform fore-and-aft of said axis of balance, and said balance will thus be maintained independent of whether the load is carried or dumped.

2. In a vehicle of the class described, a rigid open frame, an open-bottom container carried by said frame to dump therethrough, doors for the dumping opening extending the full length thereof and mounted to swing downwardly and laterally to dumping position, arched axle means intermediate the ends of the frame and comprising a member located above the doors and extending across the frame through the sides thereof with ends projecting therebeyond, brackets sleeved on the ends of said member and secured to the frame and extending downwardly below the elevation of the container, and stub shafts extending outwardly from the lower extremities of said brackets and carried by endless-tread running gear.

In testimony whereof we hereby affix our signatures.

ARTHUR P. ARMINGTON.
STEWART F. ARMINGTON.